C. A. TREDWELL.
FISHING ROD.
APPLICATION FILED AUG. 24, 1911.
1,013,333.
Patented Jan. 2, 1912.
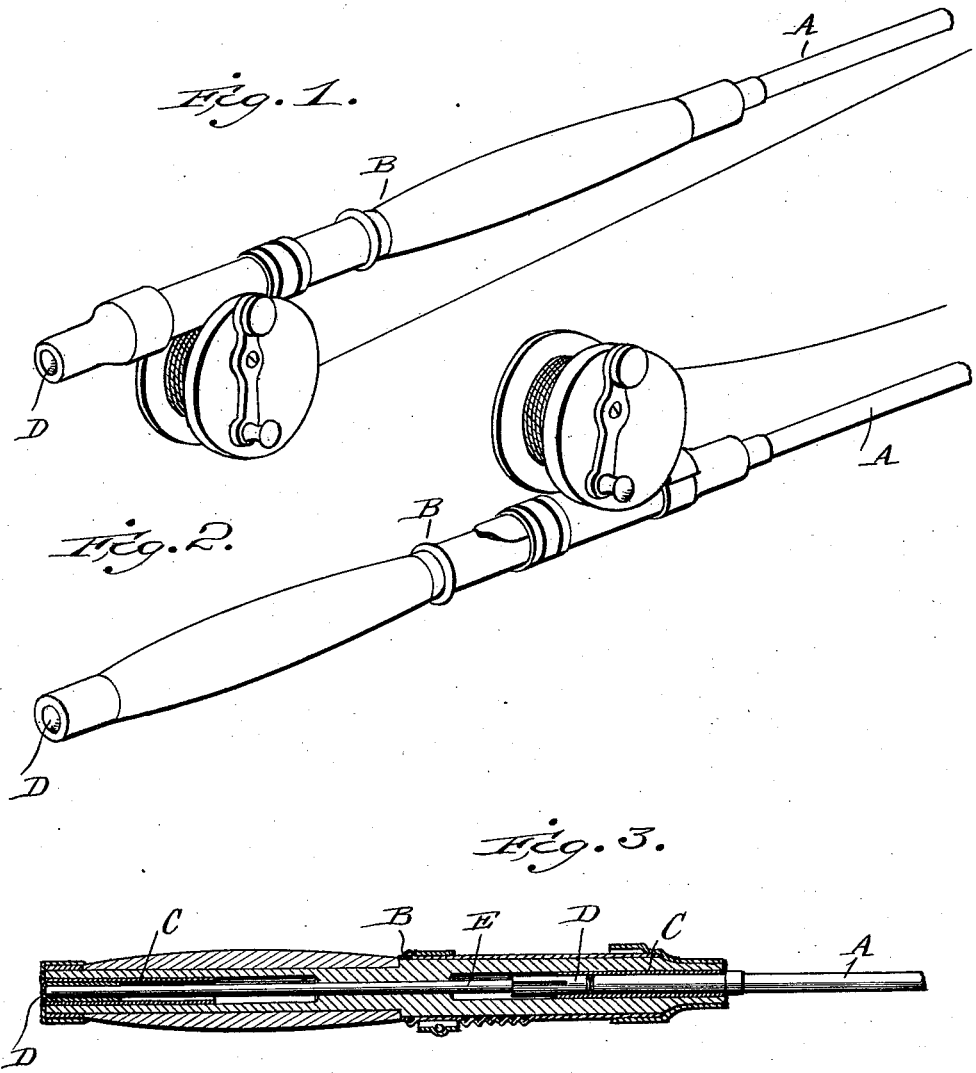

UNITED STATES PATENT OFFICE.

CHARLES A. TREDWELL, OF BRISTOL, CONNECTICUT, ASSIGNOR TO THE HORTON MANUFACTURING COMPANY, OF BRISTOL, CONNECTICUT, A CORPORATION OF CONNECTICUT.

FISHING-ROD.

1,013,333.   Specification of Letters Patent.   Patented Jan. 2, 1912.

Application filed August 24, 1911. Serial No. 645,715.

*To all whom it may concern:*

Be it known that I, CHARLES A. TREDWELL, a citizen of the United States, residing at Bristol, in the county of Hartford and State of Connecticut, have invented certain new and useful Improvements in Fishing-Rods; and I do hereby declare the following to be a full, clear, and exact description of the same, reference being had to the accompanying drawings, forming part of this specification, and to the figures and letters of reference marked thereon.

This invention relates to improvements in fishing rods and is more especially, though not exclusively, applicable to telescopic metal rods in which the handle is separable from the body of the rod, the objects of the invention being to provide a reversible handle of improved construction with which the position of the reel with relation to the hand-piece may be changed to suit the convenience of the user, or the character of the work being done; that is to say, by reversing the handle the reel may be positioned either above or below the hand-piece.

The invention consists in certain novel details of construction and combinations and arrangements of parts, all as will be now described and pointed out particularly in the appended claims.

Referring to the accompanying drawings,—Figures 1 and 2 are perspective views of the butt end of a fishing rod including the handle with the handle in a relatively reversed position in the two views; Fig. 3 is a section in a plane longitudinally of the handle with portions in elevation.

Like letters of reference in the several figures indicate the same parts.

The body of the rod indicated by the reference letter A may be of any of the usual or preferred types now in common use with its larger end formed to fit into a socket in the end of the handle portion B.

The handle portion of the rod, in accordance with the present invention, is made reversible; that is to say, it is provided at each end with a socket for the reception of the end of the rod, and in each socket there is mounted to slide longitudinally, a closure, which, when projected, closes and lies substantially flush with the end of the socket or handle, and is adapted to be pushed inwardly when the rod is inserted. In the preferred construction the two closures for the oppositely disposed sockets are adapted to be moved one by the other; thus, when the rod is pushed into one socket, thereby displacing the closure therein, the closure for the opposite socket is advanced or moved outwardly so as to close the socket and present a smooth finished appearance at the inner end of the handle, which will effectually prevent the entry of dirt, etc.

Referring particularly to Fig. 3, which illustrates a preferred embodiment of the invention, it will be seen that the handle B is provided at each end with an open ferrule C which ferrules form the sockets for the reception of the end of the rod. In each ferrule there is mounted to slide longitudinally a closed end ferrule D, each preferably split at its inner end, and expanded sufficiently to afford friction for holding the ferrule in any position to which it may be moved. Between the ferrules at opposite ends of the handle there is mounted a push rod E. Said push rod may conveniently take a bearing in the center of the handle and at its ends projects into the inner ends of the closed ferrules. The length of the push rod is such that when one closed ferrule is at the inner extreme of its movement, the other is at the outer extreme of its movement, or in position to close the opening to the socket.

The construction described is not only highly efficient for the purpose intended, but is very cheap to manufacture, inasmuch as the open ferrules may be simply crowded into the apertures formed for their reception in the end of the handle, where they will be held by friction, or their outer ends may abut against the usual external finishing ferrules commonly used on the handles of fishing rods.

To reverse the position of the handle, or change it from the position shown in Fig. 1 to that shown in Fig. 2, or vice versa, it is only necessary for the user to withdraw the rod from the socket at one end, turn the handle around, and insert the rod in the socket at the opposite end. The insertion of the rod in the opposite end of the handle displaces the closure for that socket, and moves the closure of the opposite socket into position for closing the socket, and preventing the entry of dirt into the same. In effect the user does nothing more than merely reverse the handle and insert the rod in the socket, the closing of the opposite socket being automatically effected, thereby doing away entirely with the cumbersome means heretofore employed, such, for instance, as a separate screw cap or other device which must be removed and replaced whenever the handle is reversed.

Having thus described my invention, what I claim as new and desire to secure by Letters Patent of the United States, is:

1. A reversible handle for fishing rods, having a socket at each end for the reception of the end of the rod and a sliding closure for each socket adapted to be displaced by the entry of the end of the rod.

2. A reversible handle for fishing rods having a socket at each end for the reception of the end of the rod, a sliding closure in each socket, and an operating connection between the closures whereby the displacement of one closure by the entry of the rod moves the other closure into position to close its socket.

3. A reversible handle for fishing rods having a socket at each end for the reception of the end of the rod, a closed end ferrule slidably mounted in each socket to form a closure, and a push connection intermediate said ferrules whereby the entry of the rod in one socket moves the ferrule in the other socket out into position to close the socket.

4. A reversible handle for fishing rods having an open ferrule at each end forming rod sockets, a closed ferrule in each open ferrule, each movable into position to close its ferrule, and a push rod mounted within the handle and extending into the ferrules, whereby the displacement of one closed ferrule by the entry of the fishing rod will displace the other closed ferrule to close the socket at that end of the handle.

5. A reversible handle for fishing rods having a socket at each end for the end of the fishing rod, a closure movable longitudinally in each socket, a connection intermediate the closures whereby when one is pushed inwardly the other will be pushed outwardly and frictional means for holding the closures against movement in the sockets.

CHARLES A. TREDWELL.

Witnesses:
PAUL C. BALDWIN,
CHARLES S. JOY.

---

Copies of this patent may be obtained for five cents each, by addressing the "Commissioner of Patents, Washington, D. C."